(12) United States Patent
Lin

(10) Patent No.: US 8,144,215 B2
(45) Date of Patent: Mar. 27, 2012

(54) METHOD AND APPARATUS OF USING PROCESSOR WITH ANALOG-TO-DIGITAL CONVERTER WITHIN IMAGE SENSOR TO ACHIEVE HIGH DYNAMIC RANGE OF IMAGE SENSOR

(75) Inventor: Chi-Shao Lin, Grand Cayman (KY)

(73) Assignee: Himax Imaging, Inc., Grand Cayman (KY)

( * ) Notice: Subject to any disclaimer, the term of this patent is extended or adjusted under 35 U.S.C. 154(b) by 562 days.

(21) Appl. No.: 12/464,079

(22) Filed: May 11, 2009

(65) Prior Publication Data
US 2010/0283878 A1 Nov. 11, 2010

(51) Int. Cl.
*H04N 3/14* (2006.01)
(52) U.S. Cl. .................................................. 348/229.1
(58) Field of Classification Search ............... 348/229.1, 348/296, 362, 363, 364, 230.1, 294
See application file for complete search history.

(56) References Cited

U.S. PATENT DOCUMENTS
6,717,617 B1 * 4/2004 Ozono ........................ 348/324
* cited by examiner

*Primary Examiner* — Hung Dang
(74) *Attorney, Agent, or Firm* — Winston Hsu; Scott Margo

(57) ABSTRACT

A scheme is provided that enhances the dynamic range performance of images via multiple readouts during one exposure. The readout process circuit structure includes at least an analog-to-digital converter (ADC). The analog-to-digital converter converts analog data generated from an image sensor into digital data, allowing sub-frame readouts for improving a dynamic range of the image sensor. Additionally, methods of partial digitization (not a full number of bits) and image array are provided.

13 Claims, 9 Drawing Sheets

Array size = L x M

| Case | Digitization number of bits | Data size | Normalized to original size |
|---|---|---|---|
| 1 | 10 | L x M x 10 | 100% |
| 2 | 8 | L x M x 8 | 80% |
| 3 | 6 | L x M x 6 | 60% |

FIG. 9

METHOD AND APPARATUS OF USING PROCESSOR WITH ANALOG-TO-DIGITAL CONVERTER WITHIN IMAGE SENSOR TO ACHIEVE HIGH DYNAMIC RANGE OF IMAGE SENSOR

BACKGROUND OF THE INVENTION

1. Field of the Invention

The present invention relates to image sensors, and more particularly, to a method and apparatus for an image system having processor(s) with an analog-to-digital converter therein to thereby achieve better dynamic range of the image sensor in the image system.

2. Description of the Prior Art

Digital cameras have largely replaced conventional film cameras. Typically, a digital camera contains at least an image sensor for converting incident light into electrical charges. Each image sensor consists of an array of detectors, and each detector within the array converts incident light into an electronic signal representative of the magnitude of the incident light.

In digital camera technology, one of the most popular image sensors is CMOS image sensor. For CMOS image sensors, signals received from photo detectors are read out as column readout lines, one row at a time. During a data readout process, there is no shifting of charge from one pixel to another. Since the CMOS image sensors are compatible with typical CMOS fabrication processes, an integration of additional signal processing logic on the same substrate on which the sensor array is disposed hence is permitted.

Typically, a conventional CMOS image sensor usually contains an active-pixel sensor (APS). Generally speaking, a pixel is an element of an image sensor implemented for generating a differentiable strength output signal, where the differentiable strength output signal is proportional to the magnitude of incident light. Each pixel within the image sensor is implemented for detecting, storing, and sampling a signal.

However, the conventional image sensors have some drawbacks. For example, the conventional CMOS image sensors have limited dynamic range (DR). The specified term "dynamic range" represents a maximum ratio of light intensity level to the noise floor of any given scene in a single image that the image sensor is able to capture. An equation for illustrating the definition of the dynamic range DR is shown as follows:

$$DR = \frac{HL}{LL} \quad (1)$$

In the above equation (1), HL represents the highest non-saturated optical flux, while LL represents the lowest detectable optical flux (noise floor).

Please refer to FIG. 1. FIG. 1 is a diagram illustrating transfer curves of five different pixels P1-P5 in an imaging pixel array of an image sensor under different light intensity according to the prior art. As shown in FIG. 1, the imaging pixel array takes an image with a full integration time of $t_0$ (frame integration time). $P_n$ denotes a pixel n, and $I_n$ denotes the light intensity to which pixel n is exposed. The light intensity $I_1$-$I_5$ of the respective pixels $P_1$-$P_5$ has the following inequality:

$$I_5 > I_4 > I_3 > I_2 > I_1 \quad (2)$$

The term "integration time" indicates a duration during which photo-generated carriers are collected by a pixel within the image sensor. As shown in FIG. 1, in a case where all the pixels $P_1$-$P_5$ are read out after the full integration time (i.e., $t_0$), at this time there is only the pixel $P_1$ that generates a non-saturated output $V_{o1}$ while all the remaining pixels (e.g., $P_2$-$P_5$) output the saturated output Vsat. The relation between the output voltages of the pixels $P_1$-$P_5$ is shown as follows:

$$V_{out1} = V_{o1} \quad (3)$$

$$V_{out2} = V_{out3} = V_{out4} = V_{out5} = V_{sat} \quad (4)$$

In the aforementioned description, readout schemes at the image pixels $P_2$-$P_5$ will include saturated spots where there are no meaningful image patterns. For avoiding the aforementioned saturated situation, when a pixel readout operation of the image sensor is a non-destructive process, a multiple-readout scheme can be applied to increase the dynamic range (DR).

As shown in FIG. 1, in contrast to the aforementioned single readout process, readouts at time intervals $$\frac{t_0}{2}, \frac{t_0}{4} \text{ and } \frac{t_0}{8}$$

can produce non-saturated outputs for pixels $P_2$-$P_5$ as a multiple-readout operation. In addition, the pixel readout process after a longer integration time can provide a better signal-to-noise ratio (SNR) if the readout voltage is not yet saturated.

As shown in FIG. 1, in the foregoing example readouts for each of the five pixels $P_1$-$P_5$ are listed as below:

| | | | |
|---|---|---|---|
| $t_0$ readout | $P_1$ | output | $V_{o1}$ |
| $\frac{t_0}{2}$ readout | $P_2$ | output | $V_{o2}$ |
| $\frac{t_0}{4}$ readout | $P_3$ | output | $V_{o3}$ |
| $\frac{t_0}{8}$ readout | $P_4$ | output | $V_{o4}$ |
| $\frac{t_0}{8}$ readout | $P_5$ | output | $V_{sat}$ |

For a linear response to incident light, the final equivalent outputs are listed as below:

| | |
|---|---|
| $P_1$ | $V_{o1}$ |
| $P_2$ | $2V_{o2}$ |
| $P_3$ | $4V_{o3}$ |
| $P_4$ | $8V_{o4}$ |
| $P_5$ | $8V_{sat}$ |

In the aforementioned case, the multiple-readout scheme at this time increases the saturation level by eight times. In this operating case, if the noise floor remains the same, the dynamic range will accordingly be increased by eight times. That is, if the minimum integration time is $1/m$ of the frame integration time (i.e., $t_0$), the dynamic range will be increased by m times.

Please refer to FIG. 2 in conjunction with FIG. 1. FIG. 2 is a diagram illustrating a flowchart of the conventional operations of one pixel with a multiple-readout scheme for dynamic range enhancement. In FIG. 2, the conventional operation has a defect; that is, in such a manner every DR-enhanced pixel needs one memory and the conventional image sensor has to be delicate for determining whether the output voltage of each DR-enhanced pixels is saturated or not. As a result, the system of conventional image sensor with the multiple-readout scheme for improved DR is complex and the cost of the conventional image sensor with the multiple readout scheme (i.e., DR-enhanced pixels) is high.

Another conventional manner for implementing the image sensor is to digitize a signal at the pixel level. Please refer to FIG. 3. FIG. 3 is a diagram illustrating a pixel array and a pixel of the pixel array according to the prior art. The pixel 301 has limited use for most applications since, generally, only a certain dynamic range can be utilized. As shown in a sub-diagram (A) of FIG. 3, the pixel array 300 includes a plurality of pixels 301. Referring to a sub-diagram (B) of FIG. 3, the conventional pixel structure of the pixel 301 contains a detecting device 302 (which includes a light detector, a buffer, etc.), an analog-to-digital converter (ADC) 303, and a processing device 304, wherein the processing device 304 includes a processing logic, a memory, etc. Simultaneously, implementation of the pixel 301 is complex and expensive. Furthermore, as the pixel 301 has a complex structure, the pixel size is increased resulting in a trade-off as the un-required fixed-pattern noise (FPN) is also increased, where "FPN" represents image pattern (noise) associated with the physical location of the pixel array.

Therefore, a novel mechanism and method of image sensors for improving the dynamic range of an image sensor without increasing system complexity or cost is required.

SUMMARY OF THE INVENTION

One objective of the present invention is therefore to provide a novel mechanism and method of image sensors for improving the dynamic range of an image sensor with minimum increase to the system complexity and/or cost. The present invention provides a scheme for enhancing the dynamic range performance of an image sensor via multiple readouts during one exposure, where the readout processing circuit structure of the present invention contains a processor including an analog-to-digital converter (ADC) within. In addition, the present invention also discloses a method thereof for partially digitization (not the full number of bits) and with image array sub-sampling to thereby reduce processing data required for further increasing the readout speed, reducing power consumption, and reducing the required area of data memory.

According to one aspect of the present invention, a processor for an image sensor with a multiple data readout scheme is disclosed. The processor includes an analog-to-digital converter, for converting analog data generated from the image sensor into digital data, allowing sub-frame readouts during one exposure for improving a dynamic range of the image sensor; wherein the analog-to-digital converter generates the digital data by partially digitalizing the analog date.

According to another aspect of the present invention, an imaging system is disclosed. The image system includes an image sensor for sensing light to generate analog data, and at least a column processor, coupled to the image sensor and having a multiple data readout scheme. The column processor includes an analog-to-digital converter at a column level for converting the analog data into digital data, during one exposure for improved dynamic range;

wherein the analog-to-digital converter generates the digital data by partially digitizing the analog data.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 9 is a diagram illustrating a table of data memory size and sub-sampled partially digitized readouts.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

To facilitate an understanding of the preferred embodiment, the general architecture and operation of a digital camera system will be described. The specific architecture and operation of the preferred embodiment will then be described with reference to the general architecture of the digital camera system.

Figure 1:
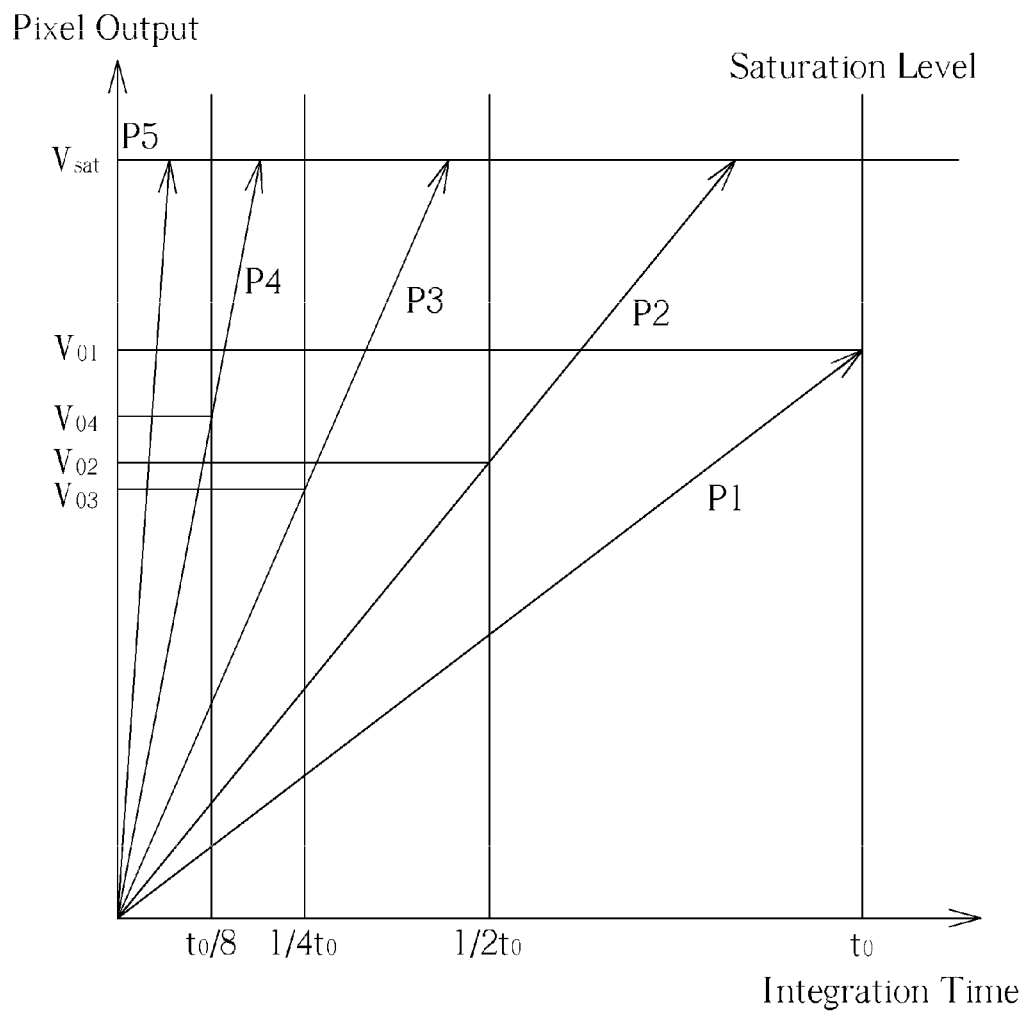
FIG. 1 is a diagram illustrating transfer curves of five different pixels in a pixel array under different light intensity according to the prior art.
Figure 2:
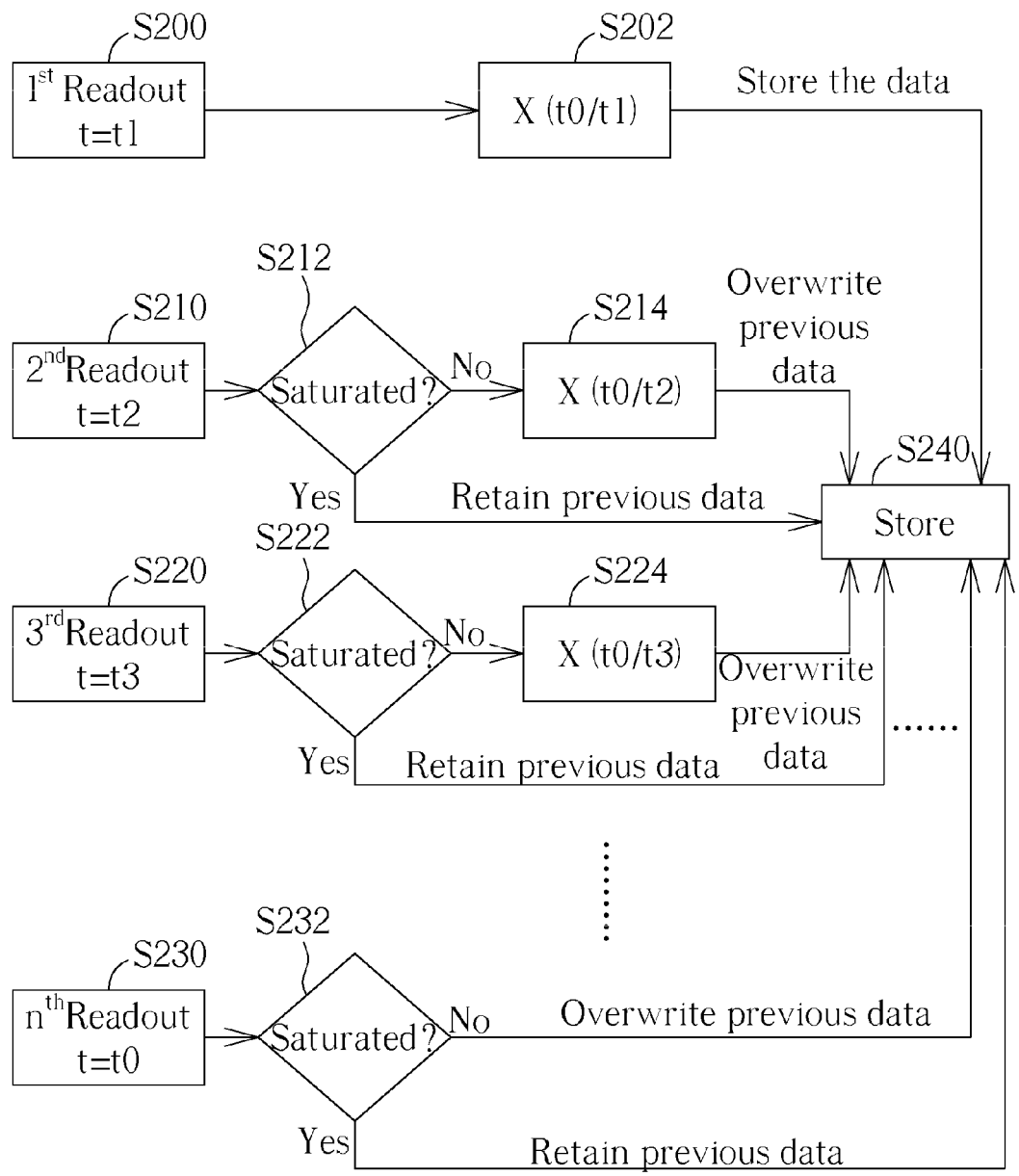
FIG. 2 is a diagram illustrating a flowchart of conventional operation of a pixel with a multiple readout scheme for a dynamic range (DR) enhancement.
Figure 3:
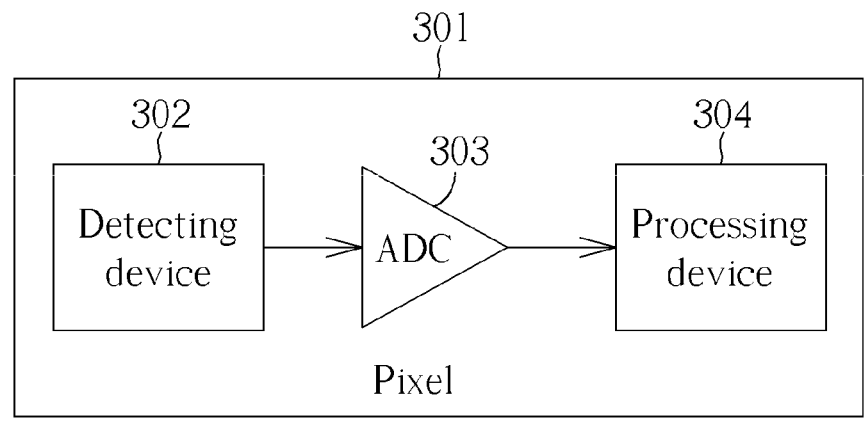
FIG. 3 is a diagram illustrating a pixel array and a pixel of the pixel array according to the prior art.
Figure 3:
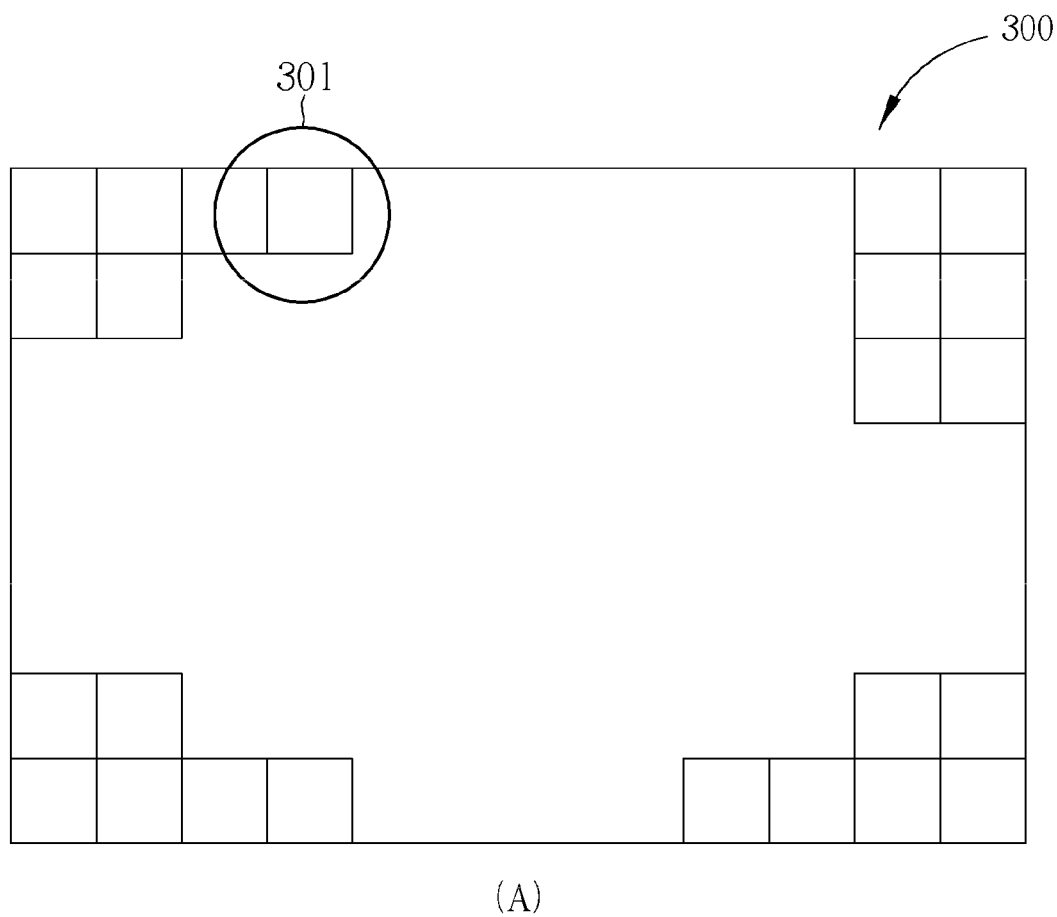
Figure 4:
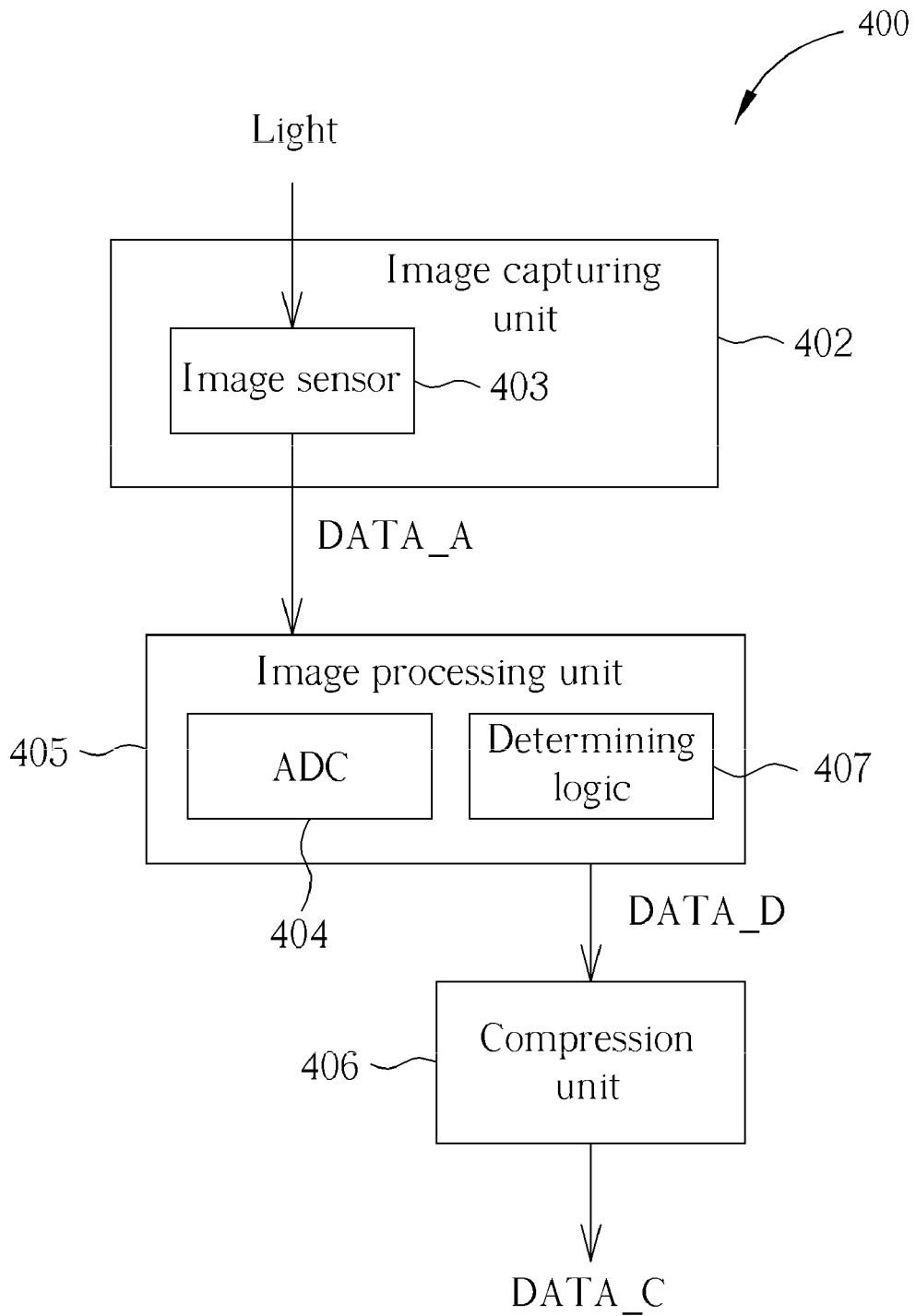
FIG. 4 is a block diagram illustrating a digital camera system according to an exemplary embodiment of the present invention.

Please refer to FIG. 4. FIG. 4 is a block diagram illustrating a digital camera system 400 according to an exemplary embodiment of the present invention. In this exemplary embodiment, the digital camera system (imaging system) 400 contains (but is not limited to) an image capturing unit 402, an image processing unit 405 and a compression unit 406. Herein the image capturing unit 402 contains at least an image sensor 403 for receiving light. The image sensor 403 in the image capturing unit 402 captures raw pixel values of each image in an analog format as analog data DATA_A; then the analog pixel values of each image are converted into a digital format as digital data DATA_D by the analog-to-digital converter 404 within the image capturing unit 402. The image processing unit 405 in this exemplary embodiment includes an analog-to-digital converter 404 and a determining logic 407. The image processing unit 405 dynamically executes a sub-sampling operation and/or a partial digitalization operation according to the received analog data DATA_A to thereby generate a corresponding digital data DATA_D.

Next, the digital data DATA_D are sent to the following image processing unit 405 and thereafter to the compression unit 406 for follow-up processing.

For instance, the image processing unit 405 determines whether the derived digital data DATA_D corresponding to each sub-readout is saturated or not and selects an appropriate readout time of the multiple-readout scheme as the output data via the determining logic 407. In certain exemplary embodiment, the compression unit 406 could be implemented using a processor or specialized application-specific integrated circuit (ASIC) to compress image data generated from the image processing unit 405. The compressed image data DATA_C outputted from the compression unit 406 is then sent to a computing system (not shown) for viewing and/or further processing. Since the operations and details of the compression unit 406 are well known by people skilled in this art, further descriptions are omitted here for brevity.

The foregoing only provides a top-level description of a digital camera system of the present invention. As is well known to those skilled in the art, in most cases a memory may be used in the digital camera system for image data storage. In addition, in another exemplary embodiment of the present invention, various units illustrated in FIG. 4 may be integrated in a single chip or embedded microprocessor. The alternative designs obey and fall within the scope of the present invention.

Figure 5:
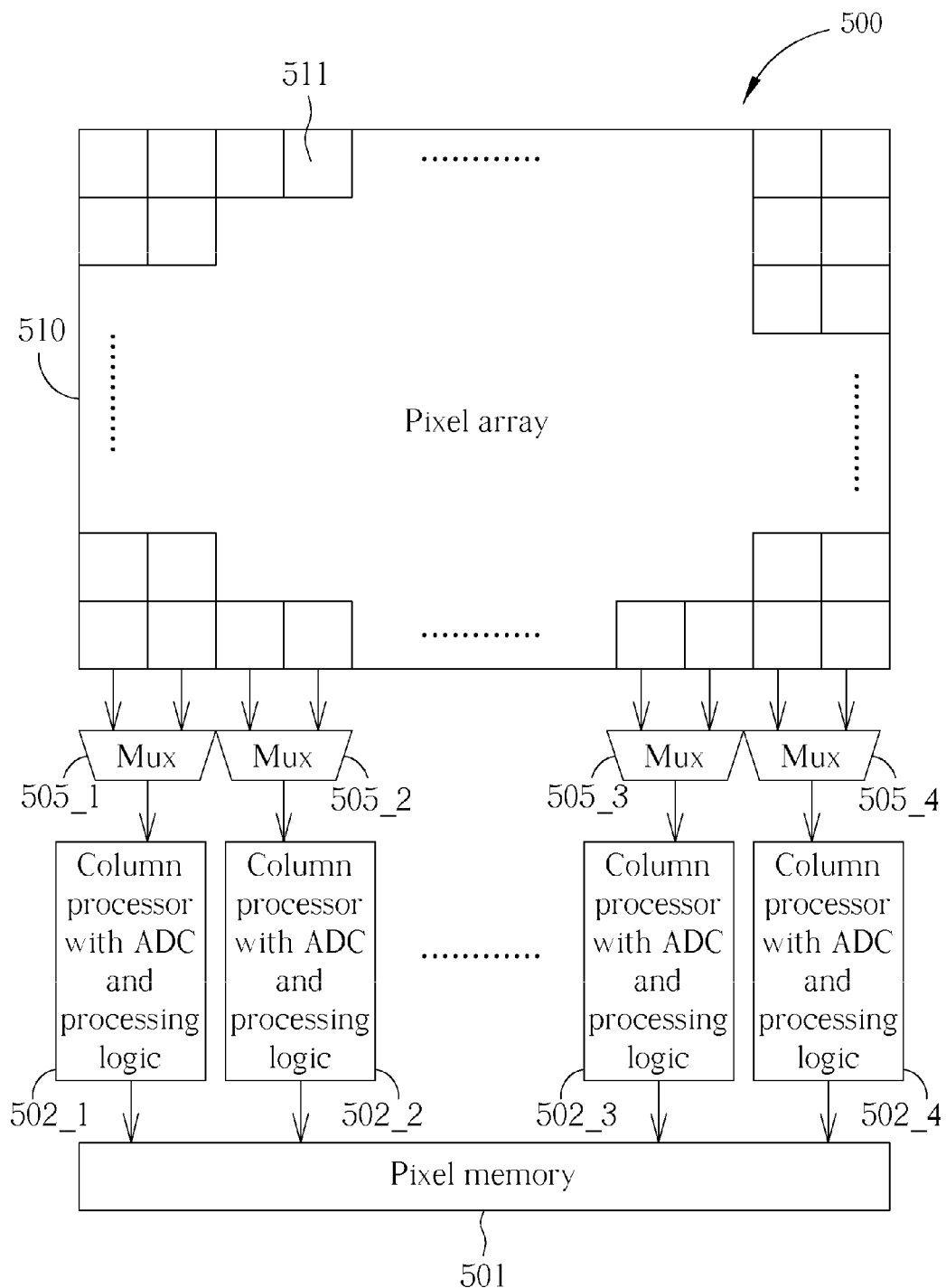
FIG. 5 is a diagram illustrating a digital camera system with a plurality of column processors according to another exemplary embodiment of the present invention.

Please refer to FIG. 5. FIG. 5 is a diagram illustrating a digital camera system 500 with a plurality of column processors 502 according to another exemplary embodiment of the present invention. In this exemplary embodiment, the digital camera system (imaging system) 500 contains (but is not limited to) a pixel array 510, a plurality of multiplexers (MUX) 505_1, 505_2, 505_3, 505_4, a plurality of column processors 502_1, 502_2, 502_3, 502_4 each having at least an analog-to-digital converter and a determining logic, and, digital camera system (imaging system) 500 further contains a pixel memory 501. Please note that only four column processors and four multiplexers are shown in FIG. 5 for simplicity. However, the number of implemented column processors 502 and multiplexers 505 depends on design requirements. The pixel memory 501 (i.e., a memory bank) is disposed outside each pixel 511 within the pixel array 510. In this exemplary embodiment, each pixel 511 of the present invention does not contain an analog-to-digital converter or memory.

As mentioned above, every column processor 502 includes an analog-to-digital converter and a determining logic, and the same column processor 502 can be shared by a plurality of pixel columns via a corresponding multiplexer when required (as shown in FIG. 5). This architecture reduces the overall chip area and the corresponding cost. However, the foregoing structure is for illustrative purpose only and not meant for a limitation of the present invention; for instance, the multiplexers 505 can be optional, with appropriate adjustments to reduce the size of the column processor 502, each column of the pixel array 510 man have one corresponding column processor. The aforementioned designs variances also obey the spirits of the present invention.

Figure 6:
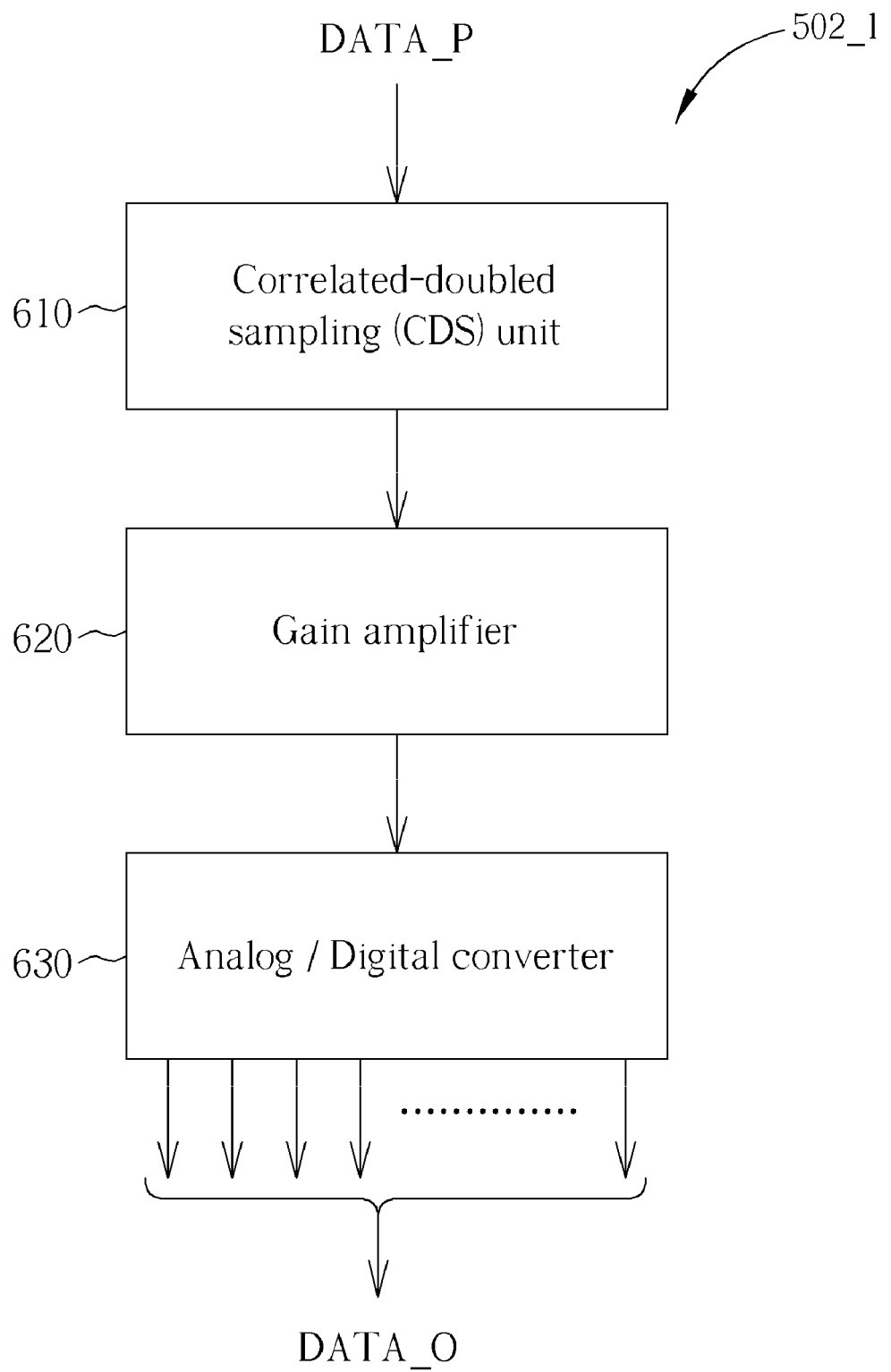
FIG. 6 is a diagram illustrating the column processor shown in FIG. 5.

Please refer to FIG. 6 in conjunction with FIG. 5. FIG. 6 is a block diagram illustrating an exemplary embodiment of the column processor 502_1 shown in FIG. 5. As each of the column processors 502_1-502_4 shown in FIG. 5 has the same architecture, only the column processor 502_1 is detailed here for brevity. In this exemplary embodiment, the column processor 502_1 contains, but is not limited to, a correlated-doubled sampling (CDS) unit 610, a gain amplifier 620, and an analog-to-digital converter (ADC) 630. As shown in FIG. 6, a pixel output DATA_P from a multiplexer 505_1 shown in FIG. 5 is sent to the CDS unit 610, and then sent to the gain amplifier 620. Furthermore, an output of the gain amplifier 620 is sent to the analog-to-digital converter 630 for generating a digital output DATA_D to the pixel memory 501 shown in FIG. 5. That is, the column processor 502 of the present invention can be provided with CDS function or even further includes determining logic (not shown) for controlling the sub-sampling operation and/or adjusting the resolution of the ADC(630) according the processed data. In this manner, the derived digital data DATA_D not only with enhanced dynamic range, but also with reduced data size; thereby the required cost is reduced with promoted readout speed.

Figure 7:
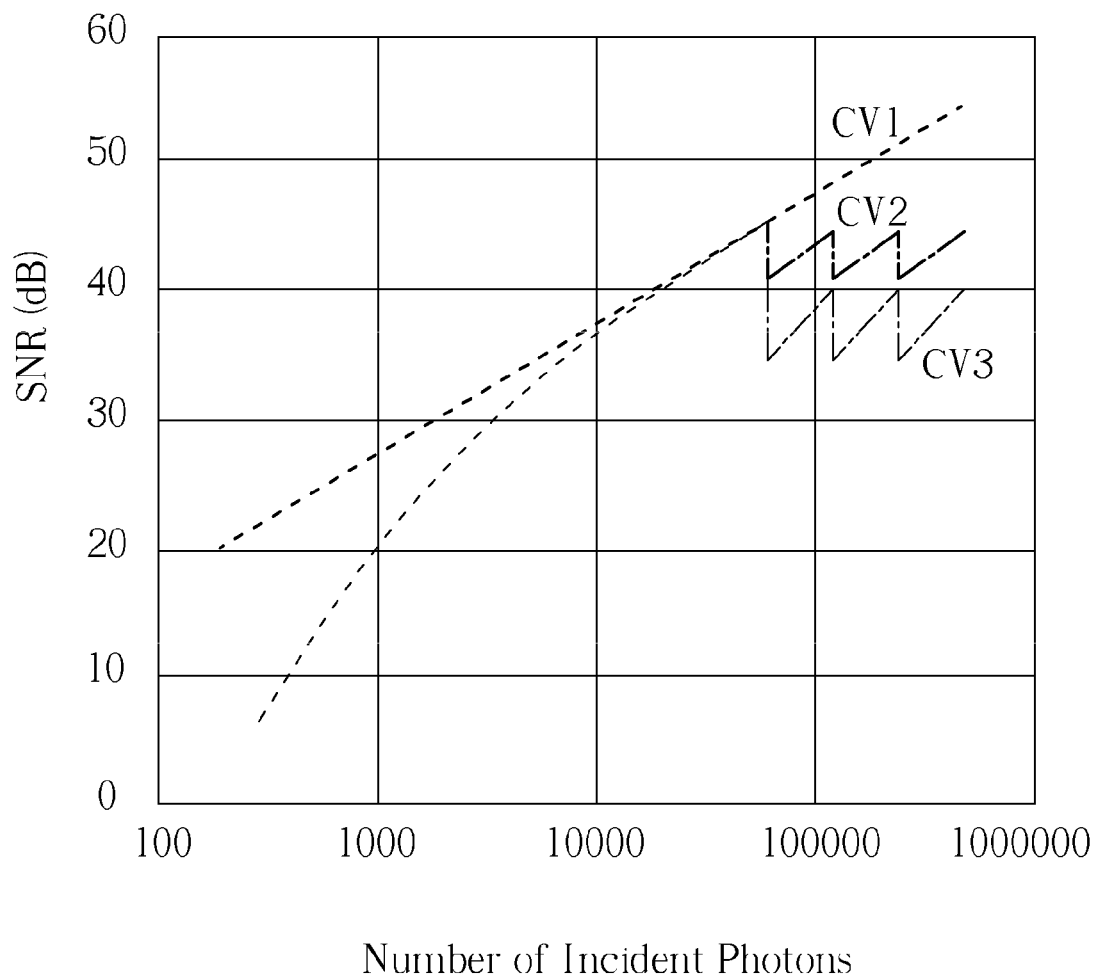
FIG. 7 is a diagram illustrating relations between the SNR and the incident light intensity.

FIG. 7 is a diagram illustrating relations between the SNR and the incident light intensity. In a typical imaging system, the SNR increases when an incident light intensity increases, as shown by characteristic curve CV1 in FIG. 7. Generally, image sensors take a parameter "maximum SNR" as one of the quality indices. However, in certain applications, SNR becomes less meaningful or meaningless after it exceeds a certain value/threshold. In such cases, enhancing dynamic range at the expense of excessive SNR can promote the overall image quality. The DR enhancement with multiple readouts is an example of such a scheme.

The characteristic curve CV2 in FIG. 7 represents an SNR with quantum efficiency (QE)=50%, read noise=40 electrons, and 10-bit digitization. Since bright spots in an image have higher SNR than darker ones, and sub-frame readouts are used for improving the corresponding dynamic range of brighter spots, these readouts can be digitized with less-than-full-number of bits. Supposing the full digitization in the exemplary example is 10-bit where the characteristic curve CV3 shown in FIG. 7 illustrates an SNR while the derived sub-frame readouts are only partially digitized (e.g., 5-bits); wherein this partially digitalized scheme, as illustrated by the characteristic curve CV3, will downshift the SNR to around 34 dB, which is 7 dB below that of the characteristic curve CV2 with full digitized operation. However, the corresponding SNR of the characteristic curve CV3 is still acceptable in many applications. Applying partially digitalizing operation upon the sub-frame readout effectively reduces the data amount; in this way when the pixel output DATA_P indicated to brighter light, for example brighter than a threshold, the column processor may use both the sub-frame and partially digitalizing operations to thereby reduce the data size with enhanced dynamical range. Please note herein the data rate of sub-frame readouts corresponding to the characteristic curve CV3 is halved than that of the characteristic curve CV2, and so is the required memory. Furthermore, each readout time can potentially be cut in half.

Figure 8:
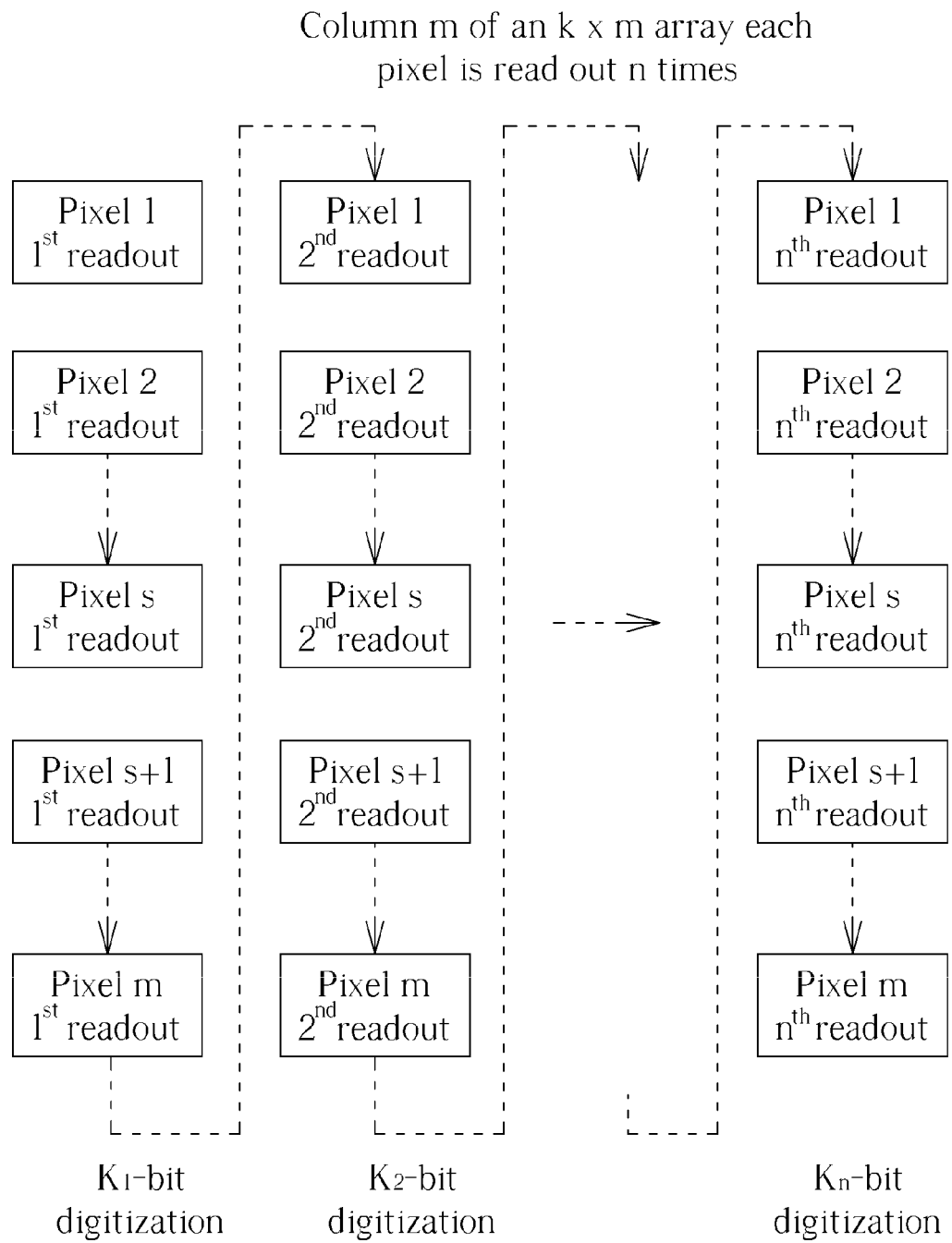
FIG. 8 is a diagram illustrating a readout sequence with a multiple readout from a column processor according to an embodiment of the present invention.

Please refer to FIG. 8. FIG. 8 is a diagram illustrating a readout sequence with a multiple-readout from a column processor according to an exemplary embodiment of the present invention. In this exemplary embodiment, a pixel array has an array size L×M, and each pixel is read out n times. For example, pixel 1 in the first row is read out n times. In this exemplary embodiment, the last readout is preferably a fully digitized readout (e.g., 10-bit digitization herein), while sub-frame readout may or may not be partially digitized (e.g., 5-bit digitization or may be other bit less than 10-bit).

Please refer to FIG. 9. FIG. 9 is a diagram illustrating an exemplary table of data memory size and partially digitized readouts.

As shown in FIG. 9; supposing that the first case in FIG. 9 illustrates the conventional data size of the derived digitalized data without executing the partial digitized operation, then the second case here expresses an actual case in the present invention applying partial digitization with 8-bit of resolution, instead of 10-bit, and the third case with 6-bit resolution. The processor controls the determining logic to selective adjust the resolution of the ADC according to the received data; the processor thereby adjusts the resolution of the ADC (selectively executes the partial digitalizing operation) according to the light intensity corresponding to the received data; the digital data outputted from the processor will with an optimized dynamic range and reduced data size. In the exemplary case in FIG. 9, the data size is 80% than that of the conventional first case when the processor applies 8-bit partial digitalizing operation. Please note the ratio (e.g., could be 1/2, 1/4, 1/8, etc) of the integration time is not one of the limitation of the present invention; furthermore, neither the adjusted resolution of the ADC in the processor. For instance, once the full resolution of the ADC is 20 bits, the processor may selectively adjusting the degree of the partial digitalization according the light intensity, the resolution of the ADC corresponding to the partial digitalizing operation can vary from 1 bit to 19 bits according to the control of the determining logic. The alternative designs obey and fall within the scope of the present invention.

Those skilled in the art will readily observe that numerous modifications and alterations of the device and method may be made while retaining the teachings of the invention.

What is claimed is:

1. A processor for an image sensor with a multiple data readout scheme, comprising:
   an analog-to-digital converter, for converting analog data generated from the image sensor into digital data, allowing sub-frame readouts during one exposure for improving a dynamic range of the image sensor;
   wherein the analog-to-digital converter generates the digital data by partially digitizing the analog data.

2. The processor of claim 1, wherein the analog-to-digital converter is at a column level.

3. The processor of claim 1, wherein during each of the sub-frame readouts, the analog-to-digital converter converts one analog signal from the image sensor to one digital signal.

4. The processor of claim 3, wherein the digital signals, respectively corresponding to the sub-frame readouts, have different bit numbers.

5. The processor of claim 4, wherein the bit numbers are determined based on a magnitude of incident light.

6. The processor of claim 1, wherein the sub-frame readouts are activated if incident light is bright.

7. The processor of claim 1, wherein the analog-to-digital converter performs the partially digitizing if incident light is bright.

8. An imaging system, comprising:
   an image sensor, for sensing light to generate an analog data; and
   at least a column processor, coupled to the image sensor and having a multiple data readout scheme, wherein the column processor comprises:
      an analog-to-digital converter at a column level for converting the analog data generated from the image sensor into digital data, allowing sub-frame readouts during one exposure for improved dynamic range; wherein the analog-to-digital converter generates the digital data by partially digitizing the analog data.

9. The imaging system of claim 8, wherein during each of the sub-frame readouts, the analog-to-digital converter converts one analog signal from the image sensor to one digital signal.

10. The imaging system of claim 9, wherein the digital signals, respectively corresponding to the sub-frame readouts, have different bit numbers.

11. The imaging system of claim 10, wherein the bit numbers are determined based on a magnitude of incident light.

12. The imaging system of claim 8, wherein the sub-frame readouts are activated if incident light is bright.

13. The imaging system of claim 8, wherein the analog-to-digital converter performs the partially digitizing if incident light is bright.

* * * * *